United States Patent [19]

Bauman et al.

[11] 4,213,768

[45] Jul. 22, 1980

[54] NONDESTRUCTIVE TESTING OF HEPA FILTERS

[76] Inventors: Albert J. Bauman, 524 Oakdale Dr., Sierra Madre; Frank A. Morelli, 1320 Carthage Ct., Claremont, both of Calif. 91024

[21] Appl. No.: 963,803

[22] Filed: Nov. 27, 1978

[51] Int. Cl.$^2$ .................... B01D 46/10; B01D 46/52; B01D 46/54

[52] U.S. Cl. ............................................ 55/97; 73/38

[58] Field of Search .............. 55/270, 500, 97; 73/28, 73/38, 40, 421.5 R; 252/305

[56] References Cited

U.S. PATENT DOCUMENTS

| | | | |
|---|---|---|---|
| 2,848,421 | 8/1958 | Forest | 252/408 |
| 3,395,514 | 8/1968 | Bub | 55/97 |
| 3,438,179 | 4/1969 | Jouault | 55/97 |
| 3,757,499 | 9/1973 | Scott | 55/521 |
| 3,853,989 | 12/1974 | Conn et al. | 252/305 |
| 3,960,001 | 6/1976 | Hayes | 73/38 |
| 4,055,075 | 10/1977 | Allan et al. | 55/270 |
| 4,132,536 | 1/1979 | Andersen | 55/97 |

*Primary Examiner*—Frank Sever
*Attorney, Agent, or Firm*—Louis J. Bachand

[57] ABSTRACT

Method is provided for non-destructively testing the integrity of a high efficiency particulate air filters using conventional equipment with a novel testing medium comprising an aerosol of hydrophobic-surfaced particles, which is non-toxic, efficient in measuring filter integrity, unaffected by moisture and temperature conditions and non-coating of optics used in measuring, whereby more accurate measuring of HEPA filter condition is realized.

9 Claims, 1 Drawing Figure

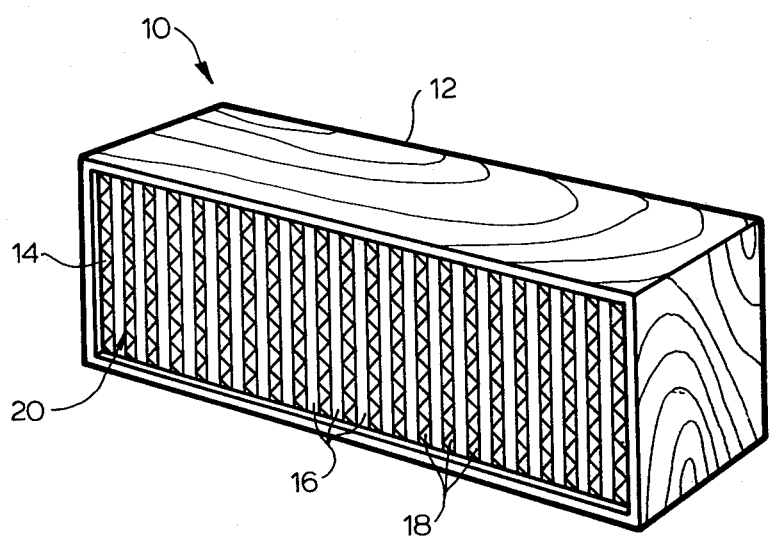

NONDESTRUCTIVE TESTING OF HEPA FILTERS

BACKGROUND OF THE INVENTION

This invention has to do with non-destructive testing of high efficiency particulate air filters. More, particularly, the invention is concerned with novel testing procedures for HEPA filters involving an advantageous aerosol of solid particles which are hydrophobic and non-toxic.

HEPA is an acronym for high efficiency particulate air filters. Such filters comprise a rigid frame and a filter pack, sealed in the frame; the filter pack comprising a tightly packed axially extended alternating series of separators and parallel reverse turns of glass cloth. The art of HEPA filters has been highly developed and numerous of these particularly effective filters are used in hospitals, clean rooms, electronic assembly and environmental safeguard installations for the removal of extremely small contaminants from an airstream, e.g. bacteria and other materials down to the size range of 0.2 micron. Because of the numerous critical applications of these filters, extensive testing is done upon them at points during manufacture, and during and after installation as well. For such purposes, there have been developed testing techniques involving the impinging of an aerosol against the filter and the recording on the opposite side of the filter of passage of the test material through the filter.

The present standard testing material in the industry is dioctyl (or dinonyl) phthalate. This material generates a fine aerosol of suitably sized particles which effectively seek our failure points in a filter or a filter installation. DOP based test readings are not entirely free from error however, and such errors can become cumulative. More particularly, DOP has been found to coat the optics in all optical instruments and scientific apparatus in the room necessitating periodic restandardization. Other shortcomings of DOP as a test material include a tendency to pick up ambient moisture, adversely affecting long term stability, potential flammability, and the ability to wick along glass cloth, because of its liquid nature, possibly causing erroneous readings.

SUMMARY OF THE INVENTION

It is accordingly a major objective of the present invention to provide a method of testing HEPA filters, which is non-destructive and free of most, if not all, of the shortcomings of DOP-based test systems. It is more particularly an object of the invention to provide a test method for HEPA filters in which optics coating is reduced or eliminated; test readings are more faithful to real filter conditions; moisture sensitivity and wicking are negligible; and reliable aerosols may be readily generated. These and other objects of the inveniton are realized by the method of non-destructively testing the integrity of a high efficiency particulate air filter having a frame and a filter pack sealed in the frame, filter pack comprising tightly packed, axially extended, alternating series of separators and parallel reverse turns of a glass cloth, in which the method includes generating in a gas stream an aerosol of solid particles having a hydrophobic surface and a mean average diameter of not more than 0.2 micron, exposing the filter to be tested to the aerosol under predetermined test conditions including a temperature at which the particles remain solid, and a pressure differential across the filter urging the gas stream aerosol through the filter, and determining the incidence of particles passing through the filter as a function of filter integrity.

Typically, the solid particles comprise silica and the method also includes maintaining a hydrophobic coating material on the silica particles during testing. The particles may be dispersed in an inert gas stream, such as nitrogen to generate the aerosol.

In particular embodiments, the method includes coating a hydrophillic particle, e.g. a silica particle, with a hydrophobic coating and thereafter generating the mentioned aerosol therewith. The coating material may comprise an organosilane of 4 to about 30 carbon atoms, e.g. one having a lower length, branch chain such as tertbutyl silane, or a long straight chain such as stearyl silane and higher up to eicosyl and tridecyl silanes, which may be coated onto the e.g. silica particle, and thereafter an aerosol generated therewith.

There is thus provided in accordance with the invention, a HEPA filter comprising a frame, and a filter pack sealed in the frame, the filter pack comprising a tightly packed axially extended, alternating series of separators and parallel reverse turns of glass cloth, the filter pack having an integrity test residual gas pervious deposit of solid particles exteriorly on its upstream side, the particles having a hydrophobic surface and a mean average diameter of not more than 0.2 micron, said filter pack being free of said particles on its downstream side. Such deposit typically comprises heterogenous particles, comprised of a normally hydrophilic solid and a hydrophobic coating, e.g. of an organosilane of 4 to 30 carbon atoms.

BRIEF DESCRIPTION OF THE DRAWING

The invention will be further described as to an illustrative embodiment, in accordance with the accompanying drawing in which the single FIGURE is a perspective view of the filter.

DESCRIPTION OF THE PREFERRED EMBODIMENTS

As will be evident from a consideration of the foregoing summary of the invention, it is contemplated that an aerosol be generated in an inert gas stream, such as nitrogen, of hydrophobic particles. Suitably, these particles may be heterogeneous, preferred are silica particles, e.g. commercial fumed (pyrolytic) microparticulate hydrophilic silica. Such silicas may be made surface-hydrophobic by treating with a suitable coating material. Preferred for use in such coating operations in accordance with the invention an organosilane, e.g. bulky organosilane such as short, branch chain silanes like tert-butyl silane or a long chain fatty acid silane e.g. stearyl (C-18) silane, to form the particles to be used in generating an aerosol in accordance with the invention. The mentioned silica is treated in ether with the mentioned silane(s). Resultant particles do not disperse in water but are oil dispersable, e.g. in vacuum pump oil (hydrocarbon), or silicone oils.

Inspection of the coated particles by a scanning electron microscope examination reveals primary particles which are spherical and about 0.02 micron in diameter, aggregated into clumps of 0.2 micron in diameter.

Other solid materials at the test conditions may be used, suitably coated with a hydrophobic material if needed. Use conditions will rarely exceed an ambient temperature of 150° C., and particulate materials having a suitable size range and remaining solid at indicated temperature test conditions may be used if other criteria set forth above are met. "Solid" herein refers to a zero or negligible vapor pressure characteristic in the test material. The term "glass cloth" herein refers to thermoplastic fibrous materials formed into coherent webs of a woven or non-woven (random) nature.

EXAMPLE

The preferred test material, comprising fumed silica, coated with stearyl silane in ether, and dried, was evaluated for performance in a conventional test setup by placing the particulate material in an aerosolizing generator coupled to a high pressure nitrogen source. The resultant aerosol was blown against the upstream side of a test filter under sufficient pressure to blow the gas stream through the filter. An isokinetic sampling probe coupled to a aerosol photometer (Sinclair Phoenix) was used to test the downstream side of the filter for particle incursions. No particles were noted to pass the filter. Thereupon a hole was made in the filter with a common pin (estimated hole diameter was 0.2 millimeters) whereupon the probe was able to accurately pinpoint the location of the hole which had been made.

The invention thus provides a tested product and a test method involving the use of powdered hydrophobic nonliquid, solid particles, e.g. silica coated to be hydrophobic, to test the integrity of clean room facilities of any type, e.g. in hospitals, government manufacturing or environmental situations, prior to a filter being made operational. Additionally, such filters can be tested at their use point without removal.

The tested product is depicted in the drawing. Filter 10 comprises a frame 12, a filter pack 14 comprising parallel reverse turns of glass cloth 16 interleaved with corrugated separators 18 axially tightly packed in the frame having a test quantity deposit of solid particles 20 thereon exaggerated in size and spacing for illustration.

We claim:

1. Method of non-destructively testing the integrity of a high efficiency particulate air filter having a frame and a filter pack sealed in the frame, said filter pack comprising a tightly packed axially extended alternating series of separators and parallel reverse turns of glass cloth along which a liquid tends to wick; said method including generating an aerosol in a gas stream of solid particles free of said liquid and having a hydrophobic surface and a mean average diameter of not more than 0.2 micron, exposing the filter to be tested to said aerosol under predetermined test conditions including a temperature at which said particles remain solid, and a pressure differential across the filter urging said gas stream aerosol through the filter.

2. Method according to claim 1 in which said solid particles comprise silica, and including also maintaining a hydrophobic coating material on said silica particles during testing.

3. Method according to claim 1 including dispersing said particles in an inert gas stream to generate said aerosol.

4. Method according to claim 1 including also coating a hydrophilic particle with a hydrophobic coating, and thereafter generating an aerosol thereof.

5. Method according to claim 1 including also, coating a silica particle with an organosilane or more than 4 carbon atoms, and thereafter generating said aerosol thereof.

6. Method according to claim 1 including also, coating a fumed silica with a hydrophobic coating comprising an organosilane of more than 4 carbon atoms, and thereafter generating said aerosol thereof.

7. Method according to claim 6 in which said silica particle is coated with stearyl silane.

8. Method according to claim 6 in which said silica particle is coated with tert-butyl silane.

9. Method of generating an aerosol for non-destructive testing of a HEPA filter including coating silica particles having a mean average diameter of not more than 0.2 microns with an organosilane of more than 4 carbon atoms, and thereafter dispersing said silica particles in an inert gas stream.

* * * * *